US012412357B2

(12) United States Patent
Seva et al.

(10) Patent No.: US 12,412,357 B2
(45) Date of Patent: *Sep. 9, 2025

(54) SYSTEM AND METHOD OF PROVIDING A CUSTOMIZABLE VIRTUAL ENVIRONMENT

(71) Applicant: Exemplis LLC, Cypress, CA (US)

(72) Inventors: Marcellus Pangilinan Seva, Mission Viejo, CA (US); Melissa Waters Chapman, Manhattan Beach, CA (US)

(73) Assignee: Exemplis LLC, Cypress, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,016

(22) Filed: May 29, 2024

(65) Prior Publication Data

US 2024/0394994 A1    Nov. 28, 2024

Related U.S. Application Data

(63) Continuation of application No. 17/950,030, filed on Sep. 21, 2022, now Pat. No. 12,002,181, which is a continuation of application No. 17/135,786, filed on Dec. 28, 2020, now Pat. No. 11,488,373.

(60) Provisional application No. 62/954,365, filed on Dec. 27, 2019.

(51) Int. Cl.
*G06T 19/20* (2011.01)
*G06Q 30/0601* (2023.01)
*G06T 19/00* (2011.01)

(52) U.S. Cl.
CPC ......... *G06T 19/20* (2013.01); *G06Q 30/0621* (2013.01); *G06T 19/006* (2013.01); *G06T 2219/2004* (2013.01); *G06T 2219/2012* (2013.01)

(58) Field of Classification Search
CPC ...... G06T 19/003; G06T 19/006; G06T 19/20
See application file for complete search history.

(56) References Cited

U.S. PATENT DOCUMENTS

| | | |
|---|---|---|
| 11,488,373 B2 | 11/2022 | Seva et al. |
| 12,002,181 B2 | 6/2024 | Seva et al. |
| 2011/0317593 A1 | 12/2011 | Bonkowski |
| 2013/0179841 A1 | 7/2013 | Mutton et al. |
| 2014/0282220 A1 | 9/2014 | Wantland et al. |
| 2016/0078683 A1 | 3/2016 | Sudol et al. |
| 2018/0176483 A1 | 6/2018 | Knorr et al. |
| 2019/0108578 A1 | 4/2019 | Spivack et al. |

(Continued)

*Primary Examiner* — Charles Tseng
(74) *Attorney, Agent, or Firm* — Knobbe, Martens, Olson & Bear, LLP

(57) ABSTRACT

A system and method generating a virtual environment of an imaged space are disclosed. In one aspect, the system comprises a communication circuit configured to communicate via a network with one or more data sources and a memory configured to store instructions. The system further comprises one or more hardware processors configured to execute the instructions to receive a request to display a virtual environment, request an environment image for the imaged space, and receive the environment image. The one or more hardware processors are further configured to receive at least one item image of at least one item to be placed in the virtual environment, request generation of the virtual environment, receive the virtual environment comprising virtual representations for the imaged space and the at least one item, and provide the virtual environment for interaction by a user with the at least one item and the imaged space.

20 Claims, 6 Drawing Sheets

(56) References Cited

U.S. PATENT DOCUMENTS

2019/0130650 A1 5/2019 Liu
2020/0098180 A1 3/2020 Khalid et al.

SYSTEM AND METHOD OF PROVIDING A CUSTOMIZABLE VIRTUAL ENVIRONMENT

CROSS-REFERENCE TO RELATED APPLICATIONS

This application is a continuation of U.S. patent application Ser. No. 17/950,030, filed Sep. 12, 2022, entitled SYSTEM AND METHOD OF PROVIDING A CUSTOMIZABLE VIRTUAL ENVIRONMENT, which is a continuation of U.S. patent application Ser. No. 17/135,786, filed Dec. 28, 2020, entitled SYSTEM AND METHOD OF PROVIDING A CUSTOMIZABLE VIRTUAL ENVIRONMENT, which claims priority benefit to U.S. Provisional application No. 62/954,365, filed Dec. 27, 2019, entitled SYSTEM AND METHOD OF PROVIDING A CUSTOMIZABLE VIRTUAL OFFICE, which are hereby incorporated by reference herein in their entireties.

BACKGROUND

Recent advancements in the fields of imaging, virtual computing, and digital communications have resulted in a wide variety of alternative paths by which a user can view and receive information. In particular, the advancements in image capture and virtual computing allow users to generate virtual environments based on captured images and then manipulate those virtual environments and objects in the virtual environment. In 2010, broadband Internet penetration reached 80% and wireless web penetration reached 96% penetration. With the Internet's accessibility at such heights, users are increasingly turning to its convenience for integration with virtual environments. It is desirable to enhance the generation and manipulation of the virtual environments by providing novel digital features to the virtual environment experience.

BRIEF DESCRIPTION OF THE DRAWINGS

In view of the above-mentioned disadvantages, embodiments of the disclosed technology aim to improve axial resolution of conventional inline holographic imaging. An objective is in particular to provide a holographic imaging device and a method, which enable 3D representation of objects. To this end, a main goal is out-of-focus plane signal suppression in a 2D image generated by a lens-free system.

The objective is achieved by the embodiments of the disclosed technology provided in the enclosed independent claims. Advantageous implementations of these embodiments are defined in the dependent claims.

Figure 1:
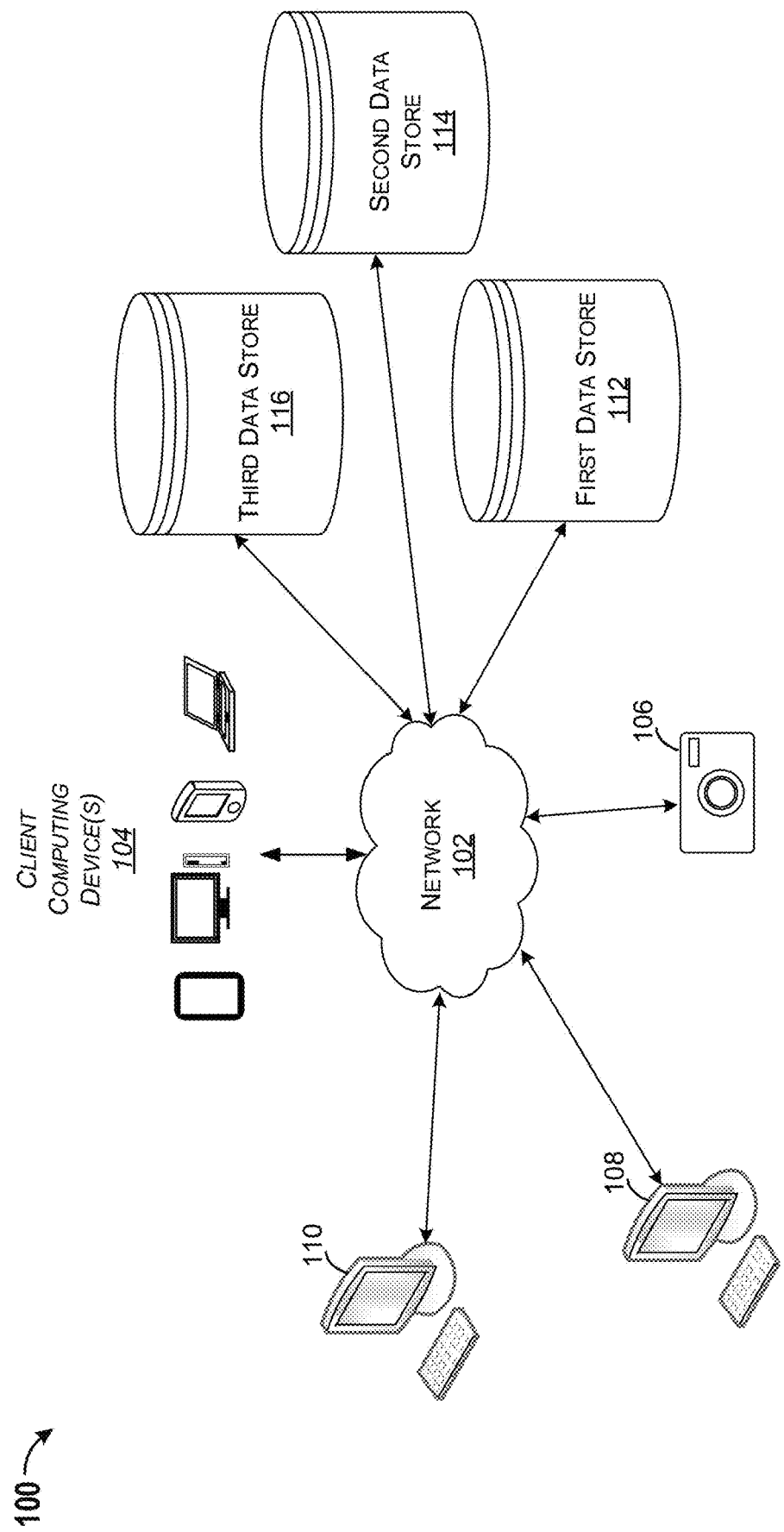

In some aspects, a system for generating a virtual environment of an imaged space is disclosed. The system comprises a communication circuit configured to communicate via a network with one or more data sources. The system further comprises a memory configured to store instructions. Further, the system comprises one or more hardware processors configured to execute the instructions. The one or more hardware processors execute the instructions to receive a request to display a virtual environment from a client device, request an environment image from an image source for the imaged space, and receive the environment image from the image source. The one or more hardware processors further execute the instructions to receive at least one item image of at least one item to be placed in the virtual environment, request generation of the virtual environment based on the environment image and the at least one item image, receive the virtual environment generated based on the environment image and the at least one item image, the virtual environment comprising virtual representations for the imaged space and the at least one item, and provide the virtual environment to a user using the client device for interaction by the user with the at least one item and the imaged space.

In some aspects, another system for generating a virtual environment of an imaged space is disclosed. The system comprises a communication circuit configured to communicate via a network with one or more data sources. The system further comprises a memory configured to store instructions and a plurality of virtual environments. Further, the system comprises one or more hardware processors configured to execute the instructions to receive a request to display a virtual environment from a client device, the request including an identifier for a user of the client device and an identifier for the virtual environment, select the virtual environment from the plurality of virtual environments stored in the memory based on the user identifier and the virtual environment identifier, receive the virtual environment generated based on images of an imaged space and at least one item, the virtual environment comprising virtual representations for the imaged space and the at least one item, and provide the virtual environment to the user using the client device for interaction by the user with the at least one item and the imaged space.

In some aspects, a method for generating a virtual environment of an imaged space is disclosed. The method comprises receiving a request to display a virtual environment from a client device, requesting an environment image from an image source for the imaged space, receiving the environment image from the image source, and receiving at least one item image of at least one item to be placed in the virtual environment. The method further comprises requesting generation of the virtual environment based on the environment image and the at least one item image, receiving the virtual environment generated based on the environment image and the at least one item image, the virtual environment comprising virtual representations for the imaged space and the at least one item, and providing the virtual environment to a user using the client device for interaction by the user with the at least one item and the imaged space.

BRIEF DESCRIPTION OF THE DRAWINGS

Reference will now be made to the accompanying drawings showing example embodiments of this disclosure in the drawings.

FIG. 1 depicts a block diagram of a network of various components in a virtual environment system.

Figure 2:
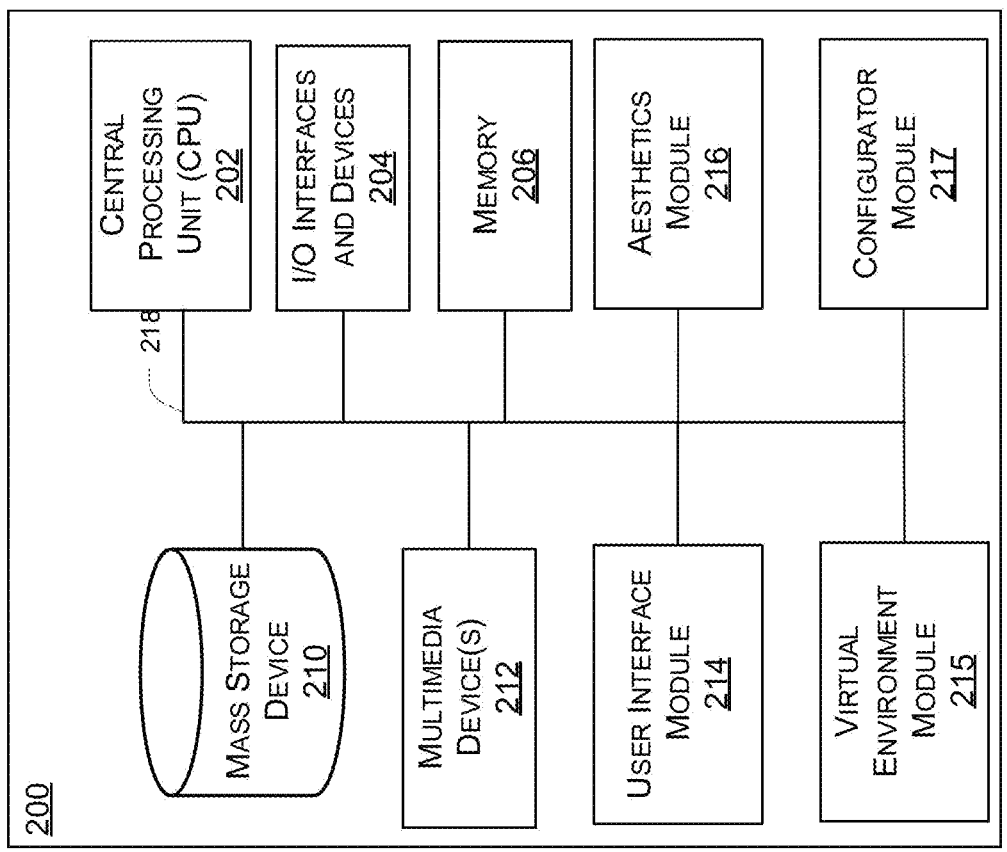

FIG. 2 is a block diagram corresponding to an aspect of a hardware and/or software component of an example embodiment of a device in the system of FIG. 1.

Figure 3A:
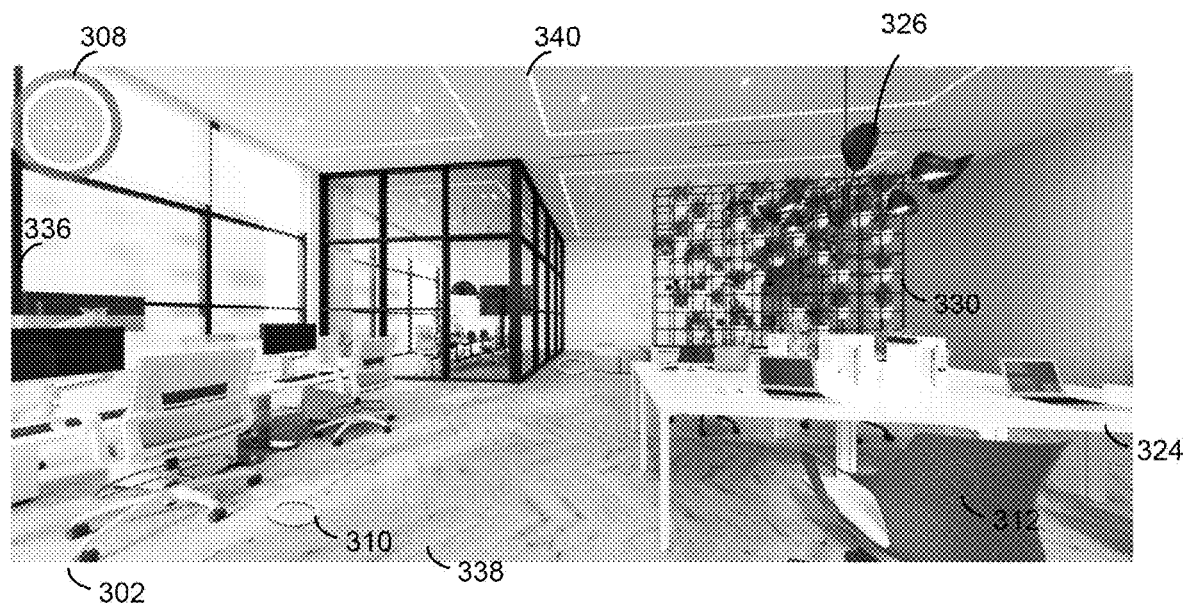

FIGS. 3A/3B show different viewpoints of an example virtual environment of a space presented as part of a website, as generated and implemented by the virtual environment system of FIG. 1.

Figure 3B:
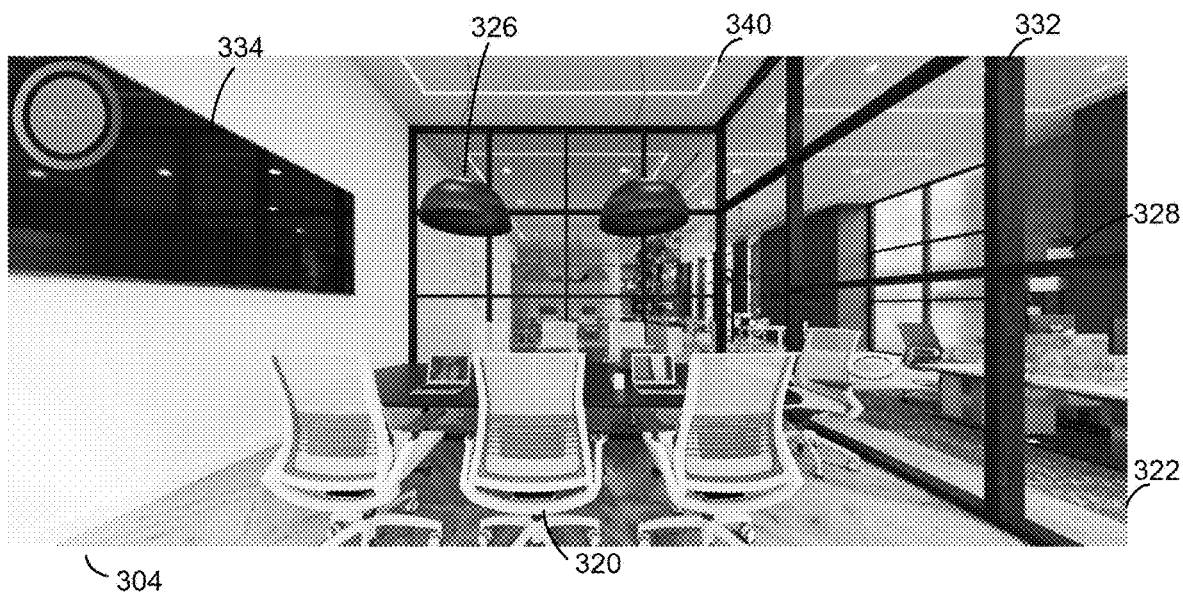
Figure 3C:

FIG. 3C shows an example expandable window that provides a summary of objects available for purchase or interaction within the example virtual environment as generated and implemented by the virtual environment system of FIG. 1.

Figure 4:
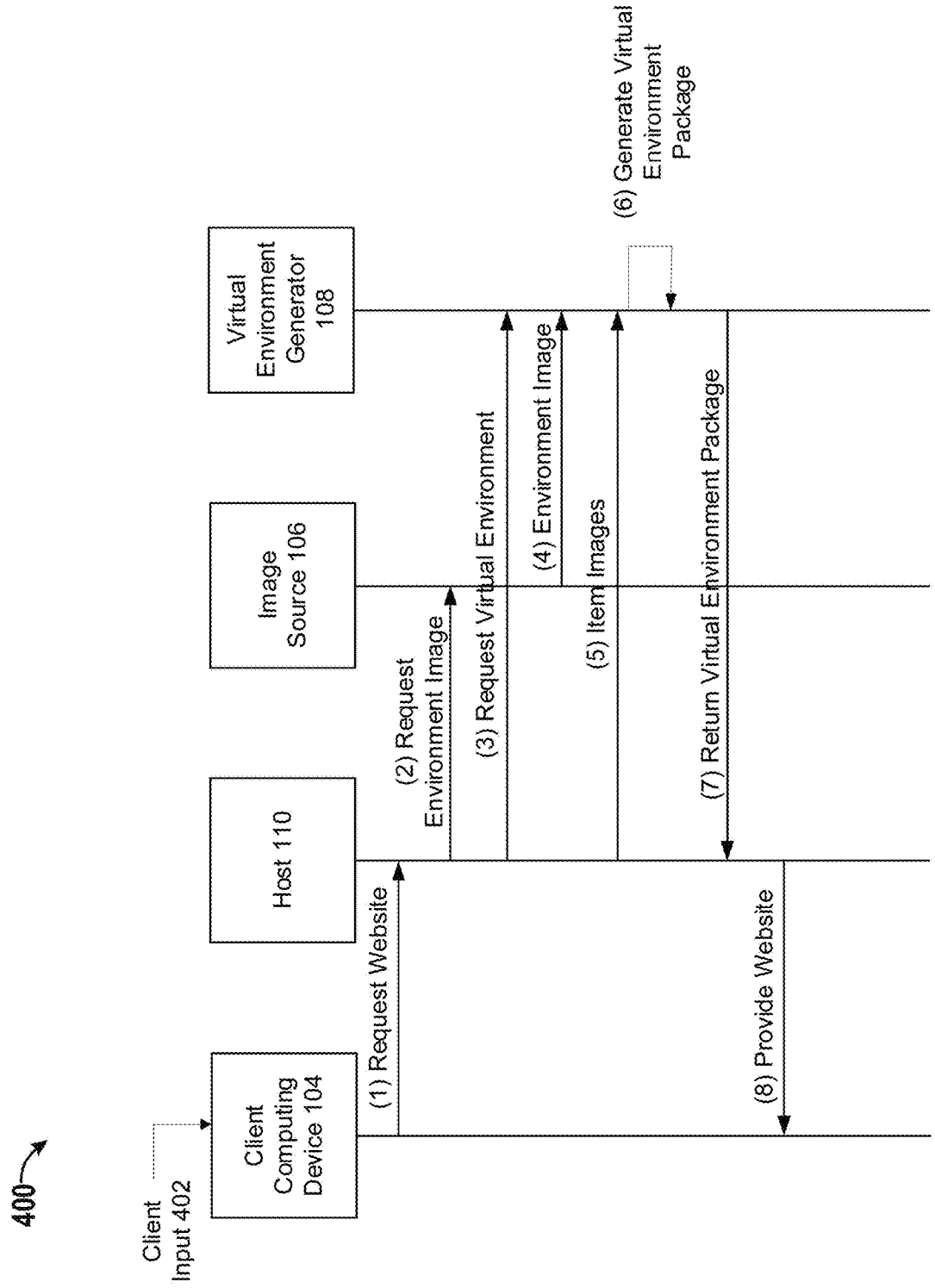

FIG. 4 illustrates an example of a dataflow for building a virtual environment including interactive objects, using the virtual environment system of FIG. 1.

Figure 5:
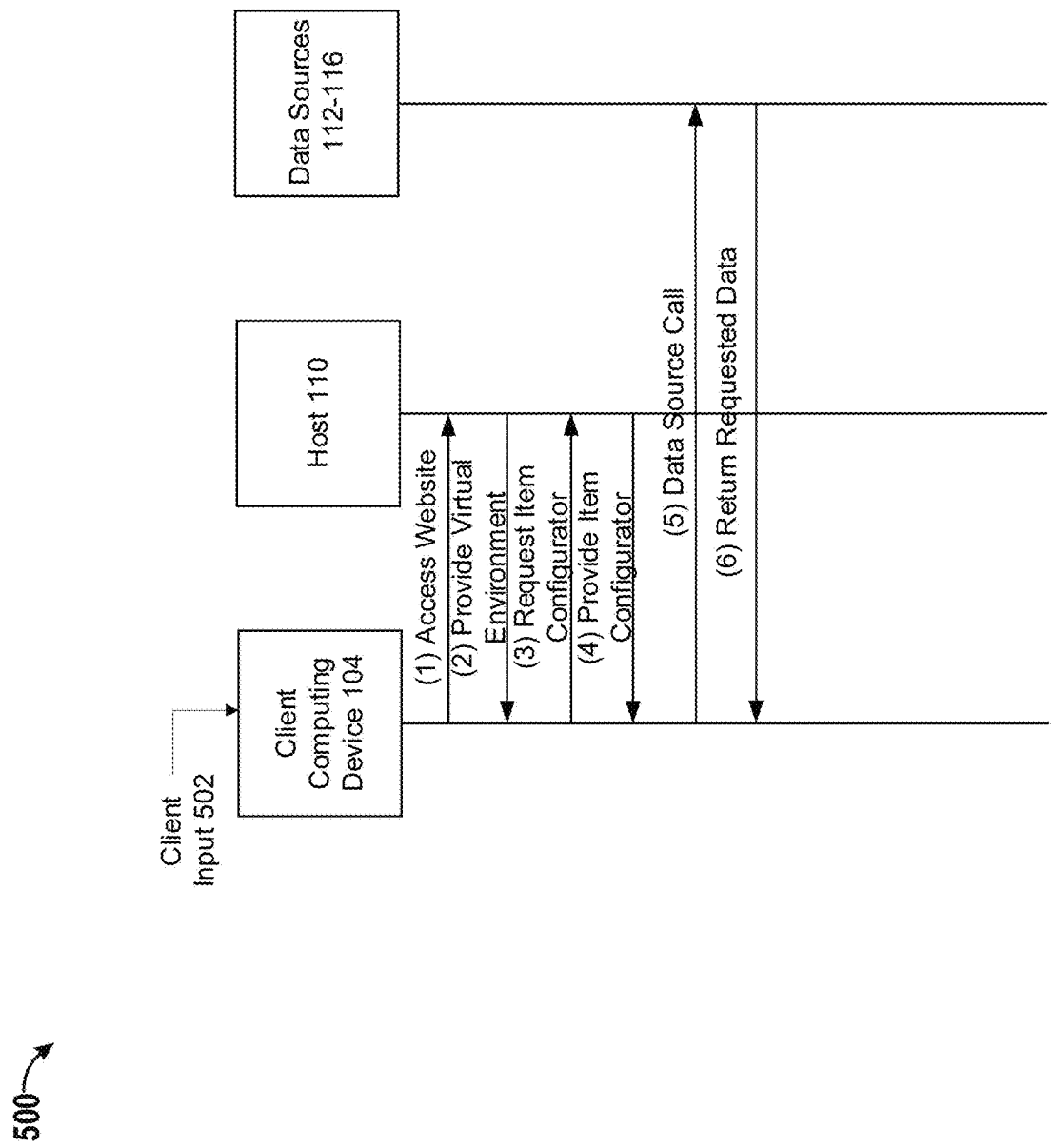

FIG. 5 illustrates an example of a dataflow for using the virtual space built using the workflow of FIG. 4 and the system of FIG. 1.

DETAILED DESCRIPTION

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The present disclosure relates to systems and methods for real-time creation, management, and viewing of or interaction with virtual environments based on images of real-world or fictional environments. This may include providing real-time creation, management, and interaction with a space where objects in the space are customizable. In some instances, the space may be an office space, a residential space, an industrial space, or the like with selectable and/or customizable objects.

Today, a majority of people complete at least a portion of their purchases online. These purchases include items from food and clothing to furniture, decorations, and vehicles. Many of these items (for example, clothes, food, vehicles, and so forth) may be easily viewed and purchased online without concern of how they look in an environment. However, some products are purchased because of how they look or function in a particular environment. For example, furniture and decorations, among others, can be purchased, at least in part, based on how they look in the particular environment and the aesthetic that they provide in combination with other furniture and decorations and in the particular environment in which they are used. For example, in an office environment, chairs and a conference table may be selected based on how they fill a conference room and an effect that they have on the spacing and/or arrangement in the room. Colors, materials, and/or textures for the chairs and the conference table may be selected based on a size of the conference room, colors, patterns, and so forth of walls, counters, or other features of the conference room, and/or colors, patterns, textures, and size of rugs and flooring or other products in the conference room.

The systems and methods described herein provide an opportunity for users purchasing certain items, for example furniture, décor, and other furnishings that impact an aesthetic of the particular environment to visualize the items being purchased in a virtual representation of the particular environment before or while the items are being purchased. For example, the systems and methods described herein may be utilized when purchasing furniture, decorations, and other items that influence, and may be influenced by, the space in which they are used and/or installed. For example, a company selling office furniture may establish a virtual office environment. Customers of the company may access the virtual office environment through a website or similar browsing portal. The virtual office environment may include various spaces (otherwise referred to herein as rooms) that are each decorated. The different spaces may be divided by physical walls or barriers or may represent different sections of the virtual office. The spaces can include different combinations of furniture, floor rugs, lighting fixtures, wall décor, window dressings, and other items that affect the feel or aesthetic of the space and/or office.

By accessing the virtual office and selecting and interacting with items in the virtual office that can be manipulated, the customer may view and understand how choices in furniture style, quantity, type, color, and so forth can impact the aesthetic and feel in the office space. As such, the customer can use the virtual office to customize these aspects of purchasable items to purchase those items that result in an overall aesthetic and feel for the customer's office or space. For example, the customer can test different styles of chairs and conference tables or desks and room dividers to ensure that the selected items will physically work together. For example, the customer can use the virtual office to ensure that the chairs will fit below the conference tables and/or that the desks and room dividers will leave sufficient space for people to move around and use the desks.

The customers may access the virtual office and visit different positions in the office. The different positions may be in different spaces in the office or provide different viewpoints of the office or a space in the office. For example, a first position may exist at an entry door of the office viewing a conference table in front of a window while a second position between the conference table and the window may view the entry door and the first position. As such, the virtual office may include multiple positions that provide the customer with different viewpoints of the office and the customer may select or activate the positions when they are displayed. Selecting a position that is shown on a screen displaying the virtual office may change the viewpoint, allowing the customer to move around the office and view furniture, decorations, and so forth in the office before buying them. Details for providing and utilizing such a virtual environment to simulate placement of items in the virtual environment are provided in the systems and methods described below.

Networked System

The systems and methods described herein utilize a number of different computing components or systems that communicate with each other, for example via a network, to generate the virtual space and use the virtual space to market and sell items. FIG. 1 depicts a block diagram of a virtual environment system 100 comprising a network 102 of various components. The virtual environment system 100 (referred to herein as system 100) comprises the network 102, client computing devices 104, an image source 106, a virtual environment generator 108, a host 110, and databases or data stores 112-116. Additionally, communication links are shown enabling communication among the components of system 100 via the network 102.

In some embodiments, one or more of the client computing device 104, the image source 106, the virtual environment generator 108, the host 110, and the databases 112-116 are locally coupled (for example, via a local communication link instead of through the network 102). For example, the image source 106, the virtual environment generator 108, the host 110, and the databases 112-116 can be locally coupled. In some embodiments, one or more of the components may be integrated. For example, the host 110 and/or the virtual environment generator 108 can be integrated with the databases 112-116. Furthermore, in some embodiments, one or more of the data stores 112-116 described herein may be combined into a single data store that is local to the host 110 and/or the virtual environment generator 108. In some embodiments, any two or more of the components described above may be integrated. In some embodiments, one or more of the components may be excluded from the communication system 100 or one or more additional components not shown in FIG. 1 may be included in the communication system 100. The communication system 100 may be used to implement systems and methods described herein.

In some embodiments, the network 102 comprises any wired or wireless communication network by which data and/or information may be communicated between multiple electronic and/or computing devices. The wireless or wired communication network may be used to interconnect nearby devices or systems together, employing widely used networking protocols. The various aspects described herein may apply to any communication standard, such as a wireless 802.11 protocol. The client computing device 104, the virtual environment generator 108, and the host 110 may comprise any computing device configured to transmit and receive data and information via the network 102. In some embodiments, the computing device 102 may be accessible locally as well as remotely via the network 102.

The client computing devices 104 may comprise any computing device configured to allow a customer to browse the Internet and/or other networks to purchase items. For example, the client computing devices 104 can view virtual environments and browse and select items for purchase from the virtual environments. The client computing devices 104 may transmit and receive data and information via the network 102. In some embodiments, the computing device 104 may be configured to capture images and submit them over the network 102. In some embodiments, the client computing devices 104 may comprise mobile or stationary computing devices.

The image capture device 106 may comprise a camera, a video recorder, a mobile phone, or any other computing or electronic device capable of capturing one or more images. The image capture device 106 may capture an image of any space or environment for use in the virtual environment. For example, the image capture device 106 may capture still images or videos (collectively referred to herein as images) of an office space, a living space, a storage space, an industrial space, and client services space, an outdoor space, or any real world space and the captured images may be used to generate the virtual environment used to sell items via a website. The image capture device 106 may provide images in a particular format, for example a format that can be used to generate a wire frame or similar structure for the virtual environment. In some embodiments, an external device converts the captured images into an appropriate format for the virtual environment generation. In some embodiments, a quantity of images provided by the image capture device 106 may depend on a complexity of the real world space as well as a level of detail desired in the virtual environment. For example, more complex spaces or more desired detail may rely on a larger quantity of images from the image capture device 106 as compared to less complex spaces or less desired detail.

The virtual environment generator 108 may comprise a computing or processing system configured to generate a virtual environment based on at least the images provided from the image capture device 106. In some embodiments, the virtual environment generator 108 may stitch together the provided images to create a realistic, virtual representation of the real world space. For example, if the image capture device 106 provides images of a simple square room with white walls and a tile floor, then the virtual environment generator may generate a virtual square room with while walls and a tile floor to match the space captured in the images. The white wall color and color or pattern of the tile floor in the virtual square room may be the same or substantially the same as the wall color and tile color or pattern in the provided images. Thus, the virtual environment generator 108 may comprise or utilize one or more image analysis modules configured to extract information from the images. For example, the image analysis modules may identify on or more of objects, colors, shapes, sizes, textures, and so forth in the image and analyze such information to generate the virtual square room as accurately as possible. Thus, the virtual square room is a virtual representation (also referred to herein as the "virtual environment") of the original space. The objects or items in the virtual environment may be configurable using one or more configuration modules as described herein, representing one or more of plants, wall hanging, artwork, window coverings, murals, light fixtures, mobiles, ceiling hanging items, chairs, tables, carpets, floor coverings, countertops, vases, couches, seating implements (any item on which a person can sit), other décor, and the like.

In some embodiments, the virtual environment may include one or more items that exists in the real world space or that may be placed into the real world space. For example, the one or more items comprises furniture, decorations, room dividers, light fixtures, rugs, and so forth. In some embodiments, the one or more items may not exist in the real world space but may be obtained for the real world space based on how a customer determines the one or more items would fit into the real world space based on the virtual environment. Thus, the customer may use the virtual environment to get an idea or feel for how a particular combination of one or more items would function and feel in the real world space.

Thus, the virtual environment generator 108 may generate the virtual environment representing a real world space based on images or files of the real world space and images or files of the items that can be placed into the real world space. The virtual environment generator 108 may generate the virtual environment for the real world space as a self-contained package. As a self-contained package all files, etc., for the virtual environment and virtual items in the virtual environment (for example, virtual representation of walls, items, flooring, lighting, etc., and the corresponding details) are stored locally such that a computing device viewing the virtual environment need not depend on communications outside of the virtual environment just to view the virtual environment.

The host 110 may comprise a computing device configured to host information for another computing device. For example, the host 110 may comprise a website host or other database host, for example for a client computing device 104. As such, the host 110 may be the "face" of the virtual environment system 100 to the customer (for example, via the client computing devices 104). For example, the customer accesses a user interface hosted by the host 110. The user interface may comprise login and password fields for the customer to access a particular, saved, virtual environment, provide the customer with an option to create a new virtual environment, or view a generic virtual environment.

When the customer provides login information, the host 110 provides the customer with access to the customer's profile, history of orders, and existing, generated virtual environments, if any. The generated virtual environments may comprise new or custom virtual environments generated by the virtual environment generator 108 based on real world space images provided by, for example, the customer. When the customer selects to create a new virtual environment, the host 110 may provide the customer with the option to start with a template virtual environment or to create a new virtual environment based on images provided by the customer, or apply images to a template. The customer can save any new virtual environment to the customer's account if the customer creates or has an account and provides corresponding login information. In some embodiments, the host 110 or the virtual environment generator 108 may have or be configured to generate a virtual environment based on a template. For example, the template may comprise a generic environment that may generally represent a real world space at a high level. Multiple templates may exist, for example for a generic office space, for a generic living room, a generic kitchen space, a generic meeting space, and so forth. The templates may be used to generate corresponding generic virtual environments that customers can use to get a general idea of furniture and decoration ideas when they do not have images to create the virtual environment for their actual real world space. When the customer views the generic virtual environment, the customer may see the virtual environment of FIGS. 3A and 3B. The customer may be able to move through the virtual environment as described below and customize items in the virtual environment, but details of the space itself may not be manipulated by the customer or otherwise customizable. Thus, the customer may have different options or levels for viewing virtual environments.

In some embodiments, the host 110 may "host" the virtual environment via a website or similar accessible content for the customer. As such, the host 110 may also host any configurator modules for items in the virtual environment. For example, a chair or table in the virtual environment may be customizable by the customer for purchase or viewing in the virtual environment. As described in more detail below, such customization may be performed via a configurator module. The configurator module may provide the customer with the various options available for customization. For example, when the customer opts to customize a chair, the configurator module may provide the customer with options for customizing each of the chair legs, chair back, chair seat, chair armrests, chair adjustments, and so forth. Thus, each item or each item type (for example, desk chair, conference table chair, desk, conference table, etc.) may have different configurator modules because each type of item may have different customization or configuration options. In some embodiments, different types or styles of chairs may have different options available. The configurator modules may be hosted by the host 110 but linked or integrated with the respective virtual environment in which the corresponding item exists.

The data stores 112-116 comprise data used by the configurator modules and/or by the virtual environment generator 108. For example, the virtual environment generator 108 may generate the virtual environment based on the images provided by the image source 106 but also based on images stored in, for example, the first data store 112. Additionally, the first data store 112 may include "vision" or "idea" images that are provided to provide a feel for the desired look of the generated virtual environment including the items displayed in the virtual environment. In some embodiments, one or more of the data stores 112-116 include details and/or customization options for the items, including different item types.

For example, one or more of the data stores 112-116 includes options for chairs, including different chair types (desk chairs, lounge chairs, etc.), style options (for example, chairs with or without armrests or without or without full chair backs, etc.), color options, pattern options, material options, and so forth. Similarly, one or more of the data stores 112-116 may include options for rugs, room dividers, planters, wall hangings, lighting fixtures, cabinetry, countertops, and so forth. One or more of the data stores 112-116 may include options for tables, desks, doors, wall materials, wall colors, wall textures, wall patterns, and so forth.

In some embodiments, one or more of the data stores 112-116 may include options for floor materials, floor colors, floor patterns, ceiling materials, ceiling fixtures, ceiling patterns, ceiling fans, window coverings, window types, window materials, and so forth. In some embodiments, more than three data stores may exist. In some embodiments, the necessary data stores may be consolidated into fewer than three data stores. In some embodiments, the data stores 112-116 may store aesthetics options, for example configuration information associated with different aesthetic choices. For example, a warm aesthetic choice can be associated with a first set of configuration information stored in the data stores 112-116 and a cool aesthetic choice can be associated with a second set of configuration information stored in the data stores 112-116. FIG. 2 is a block diagram corresponding to an aspect of a hardware and/or software component of an example embodiment of a device 200 in the system 100 of FIG. 1. The hardware and/or software components, as discussed below with reference to the device 200 may be included in any of the devices of the system 100 (for example, the client computing device 104, the image source 106, the virtual environment generator 108, the host 110, the data stores 112-116, and so forth). These various depicted components may implement the systems and methods described herein.

In some embodiments, certain modules described below, such as the aesthetics module 215, a user interface module 214, a virtual environment module 215, or an aesthetics module 216 included with the device 200 may be included with, performed by, or distributed among different and/or multiple devices of the system 100. For example, certain user interface functionality described herein may be performed by the user interface module 214 of various devices such as the client computing device 102 and/or the virtual environment generator 108 or the host 110, among other components. In some instances, these modules may work together with the one or more data stores 112-116 including options to implement the configurator modules described above regarding items and/or features of the virtual environment.

In some embodiments, the various modules described herein may be implemented by either hardware or software. In an embodiment, various software modules included in the device 200 may be stored on a component of the corresponding device itself (for example, a local memory 206 or a mass storage device 210), or on computer readable storage media or other component separate from or remote to the device and in communication with the device, for example via the network 102 or other appropriate means.

The device 200 may comprise, for example, a computer that is IBM, Macintosh, or Linux/Unix compatible or a server or workstation or a mobile computing device operating on any corresponding operating system. In some embodiments, the device interfaces with a smart phone, a personal digital assistant, a kiosk, a tablet, a smart watch, a car console, or a media player. In some embodiments, the device may comprise more than one of these devices. In some embodiments, the device, as shown in the device 200, includes one or more central processing units ("CPUs" or processors) 202, I/O interfaces and devices 204, memory 206, the virtual environment module 215, a mass storage device 210, a multimedia device 212, the user interface module 214, an aesthetics module 216, and a bus 218.

The CPU 202 may control operation of the device. The CPU 202 may also be referred to as a processor. The processor 202 may comprise or be a component of a processing system implemented with one or more processors. The one or more processors may be implemented with any combination of general-purpose microprocessors, microcontrollers, digital signal processors ("DSPs"), field programmable gate array ("FPGAs"), programmable logic devices ("PLDs"), controllers, state machines, gated logic, discrete hardware components, dedicated hardware finite state machines, or any other suitable entities that can perform calculations or other manipulations of information.

The I/O interface 204 may comprise a keypad, a microphone, a touchpad, a speaker, and/or a display, or any other commonly available input/output ("I/O") devices and interfaces. The I/O interface 204 may include any element or component that conveys information to the user of the device 200 (for example, a customer, a vendor, the entity hosting the virtual environment and selling items, or another entity) and/or receives input from the user. In one embodiment, the I/O interface 204 includes one or more display devices, such as a monitor, that allows the visual presentation of data (for example, the virtual environment) to the customer. More particularly, the display device provides for the presentation of GUIs, virtual environments, application software data, websites, web apps, and multimedia presentations, for example.

In some embodiments, the I/O interface 204 may provide a communication interface to various external devices. For example, the device is electronically coupled to the network 102 (FIG. 1), which comprises one or more of a LAN, WAN, and/or the Internet. Accordingly, the I/O interface 204 includes an interface allowing for communication with the network 102, for example, via a wired communication port, a wireless communication port, or combination thereof. The network 102 may allow various computing devices and/or other electronic devices to communicate with each other via wired or wireless communication links.

The memory 206, which includes one or both of read-only memory (ROM) and random access memory ("RAM"), may provide instructions and data to the processor 202. For example, data received via inputs received by one or more components of the device may be stored in the memory 206. A portion of the memory 206 may also include non-volatile random access memory ("NVRAM"). The processor 202 typically performs logical and arithmetic operations based on program instructions stored within the memory 206. The instructions in the memory 206 may be executable to implement the methods described herein. In some embodiments, the memory 206 may be configured as a database and may store information that is received via the user interface module 214 or the I/O interfaces and devices 204.

The device 200 may also include the mass storage device 210 for storing software or information (for example, the generated virtual environments, generated product databases, links for product modules in the virtual environments, and so forth. Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors 202, cause the processing system to perform the various functions described herein. Accordingly, the device 200 may include, for example, hardware, firmware, and software, or any combination therein. The mass storage device 210 may comprise a hard drive, diskette, solid state drive, or optical media storage device. In some embodiments, the mass storage device may be structured such that the data stored therein is easily manipulated and parsed.

As shown in FIG. 2, the device 200 includes the virtual environment module 215. As described herein, the virtual environment module 215 may dynamically generate and/or manage one or more virtual environments for display to a customer. The virtual environment may include a virtual space (for example, a virtual representation of a physical office space or other space). The virtual environment generated by and/or managed by the virtual environment module 215 may also include objects or items within the virtual space, for example furniture, decorations, structural components, and so forth. Further details of the items included in the virtual environment are provided with respect to FIG. 3 below. In some embodiments, the virtual environment module 215 may also include interactive components, for example dynamic configuration tools for items in the virtual environment, different viewpoints within the virtual space, and interactive aesthetics features, which will be described in further detail below. In some embodiments, the various elements of the virtual environment are integrated into a single package. As such, each virtual environment may function in a self-contained manner. In some embodiments, each virtual environment may be self-contained with respect to the virtual space and the items in the virtual space but be linked to configuration tools to allow for customization of one or more of the items in the virtual space. One or more virtual environments generated and/or managed by the virtual environment module 215 may be stored in the mass storage device 210 or the memory 206. In some embodiments, the virtual environment module 215 may be stored in the mass storage device 210 or the memory 206 as executable software code that is executed by the processor 202. This, and other modules in the device 200, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2, the device 200 is configured to execute the virtual environment module 215 to perform the various methods and/or processes as described herein.

In some embodiments, the aesthetics module 216 may be configured to generate and/or manage aesthetics in the virtual environments generated and/or managed by the virtual environment module 215. In some embodiments, the aesthetics module 216 may utilize samples of environments and similar aesthetics information to generate and manage the virtual environments to maintain a particular feel or aesthetic throughout the virtual environments. In some embodiments, the samples and aesthetics information is received and/or acquired from the customer, from one or more data stores, from a creator of the virtual environments, and so forth. For example, the device 200 receives the samples and aesthetics information for the aesthetics module 216 via the I/O interfaces and devices 204 and the network 102.

For example, the device 200 may receive samples of office spaces that the virtual environment should "feel" or "look" like generally, while maintaining customized elements (for example, specific furniture or styles) as identified by the customer or environment builder. In some embodiments, the aesthetics module 216 may generate or manage different aesthetics for the generated or managed virtual environments and enable toggling between the different aesthetics for the virtual environments. In some embodiments, the different aesthetics may be generated as different virtual environments, such that toggling between aesthetics comprises toggling between entire virtual environments. In some embodiments, the aesthetics of the virtual environment comprises one or more of different color combinations, décor combinations, lighting combinations, and so forth. One or more aesthetics generated and/or managed by the aesthetics module 216 may be stored in the mass storage device 210 or the memory 206. In some embodiments, the aesthetics module 216 may be stored in the mass storage device 210 or the memory 206 as executable software code that is executed by the processor 202. This, and other modules in the device 200, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2, the device 200 is configured to execute the aesthetics module 216 to perform the various methods and/or processes as described herein.

In some embodiments, the configurator module 217 may link items in the virtual environment to configurator modules that allow for customizing the items in the virtual environment. In some embodiments, the configurator modules may be hosted locally or remotely (for example, accessible via the network 102). The configurator module 217 may obtain information from the virtual environment (for example, an identifier for a particular chair in the virtual environment) and call the appropriate configurator tool to allow the customer or user to adjust specifics of the particular chair for purchase or viewing in the virtual environment. In some embodiments, the configurator module 217 may be stored in the mass storage device 210 or the memory 206 as executable software code that is executed by the processor 202. This, and other modules in the device 200, may include components, such as hardware and/or software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 2, the device 200 is configured to execute the configurator module 217 to perform the various methods and/or processes as described herein.

The device 200 also includes the user interface module 214. In some embodiments, the user interface module 214 may also be stored in the mass storage device 210 as executable software code that is executed by the processor 202. In the embodiment shown in FIG. 2, the device 200 may execute the user interface module 214 to perform the various methods and/or processes as described herein.

The user interface module 214 may be configured to generate and/or operate user interfaces of various types. In some embodiments, the user interface module 214 constructs pages, applications or displays to be displayed in a web browser or computer/mobile application. In some embodiments, the user interface module 214 may provide an application or similar module for download and operation on the computing device 104, through which the customer may interface with the virtual environment system 100 to view a virtual environment and order or view items for the customer's real world space. The pages or displays may, in some embodiments, be specific to a type of device, such as a mobile device or a desktop web browser, to maximize usability for the particular device. For example, the user interface 214 may format the virtual environment to be accessible and viewable by one of a mobile device, a mobile phone, a desktop computer, a laptop computer, and so forth. In some embodiments, the user interface module 214 may also interact with a client-side application, such as a mobile phone application, a standalone desktop application, or user communication accounts (for example, e-mail, SMS messaging, and so forth) and provide data as necessary to display vehicle equity and prequalification determinations. For example, as described herein, the system 100 may be accessible to the customer via a website or via the client-side application.

In some embodiments, the I/O interfaces and devices 204 allow the customer to interact with the virtual environment. For example, the I/O interfaces and devices 204 allows the customer to select different viewpoints in the virtual environment or select items in the virtual environment for customization. Once the device 200 receives the customer inputs (for example, customization options, and so forth), the customer may view customized options in the virtual environment or review a summary of the customized item on an order page or similar interface. In some embodiments, the device 200 receives the customization information and stores the customization information in the memory 206 or the mass storage device 210 in association with an identifier for the customer to later review.

The various components of the device 200 may be coupled together by a bus system 218. The bus system 218 may include a data bus, for example, as well as a power bus, a control signal bus, and a status signal bus in addition to the data bus. In different embodiments, the bus could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of the device 200 may be combined into fewer components and modules or further separated into additional components and modules than that shown in FIG. 2.

Example Virtual Environments

FIGS. 3A/3B show different viewpoints 302 and 304 of an example virtual environment of an office space presented as part of a website, as generated and implemented by the virtual environment system of FIG. 1. The example virtual environment shown in an office space with different areas or portions of the office space. As shown, the display of the device 200 includes a window showing the displayed virtual environment and an aesthetic toggle button that toggles between "cool" 306 and "warm" 308.

The cool toggle button 306 adjusts the virtual environment (for example color, material, and pattern options) to give the virtual environment a "cooler" aesthetic. The warm toggle button 308 adjusts the virtual environment (for example color, material, and pattern options) to give the virtual environment a "warmer" aesthetic. Thus, the virtual environment in FIG. 3A depicts the warm aesthetic, while the virtual environment in FIG. 3B depicts the cool aesthetic. In some embodiments, each aesthetic may apply a different color scheme to the purchasable and non-purchasable items in the virtual environment. For example, the "warm" aesthetic may apply a color scheme or palette of warmer colors (for example, reds, oranges, and yellows) while the "cool" aesthetic may apply a color scheme or palette of cooler colors (for example, blues, greens, and purples). When the different aesthetics or color schemes are applied, the different purchasable and non-purchasable items that can be configured may be given different combinations of colors to convey the desired warm or cool aesthetic. For example, when the warm aesthetic is selected, the configurable items in the virtual environment may be given different color combinations using more warm colors (for example, more items will include a shade of yellow, orange, or red). When the cool aesthetic is selected, the configurable items in the virtual environment (whether they are purchasable or not) may be given different color combinations using more cool colors (for example, more items will include a shade of green, blue, or purple). In some embodiments, different aesthetics may include some of the same colors. For example, both the warm and cool aesthetics may include items including shades of white and/or black. Similarly, when different color schemes are used for different virtual environments or different items, the configurable items in the virtual environment(s) may include different shades that represent the desired color schemes such that different items are provided with different colors that fall within the desired color scheme or aesthetic but create a cohesive feel throughout the virtual environment. In some embodiments, hanging the aesthetics may change the items available given available customizations and/or configurations available for the items. For example, in the FIGS. 3A and 3B, the different aesthetics help the virtual environment feel more warm or cool based on the configurable items being adjusted (with respect to color) to be warmer or cooler depending on the selected aesthetic.

The virtual environment shown in FIGS. 3A and 3B includes viewpoint selectors 310, which allow the customer to move around the virtual environment. Selecting one of the viewpoint selectors 310 will change the perspective of the virtual environment to be viewed from the selected viewpoint. The virtual environment also include a customization selector 312. The customization selector 312 allows the customer to customize the corresponding item. As shown, the customization selector 312 is positioned on a desk chair. Thus, when the customer selects the customization selector 312, the configuration module described herein provides the customer with available customization options for the desk chair. As described herein, a customization selector for the rug or desk (not shown in the figures) enables the customer to configure the rug or desk, respectively, based on available options. In some embodiments, only items that are available for purchase or order are customizable (i.e., have corresponding configuration modules). In some embodiments, all displayed items can be customizable via corresponding configuration modules. In some embodiments, the virtual environment includes the chairs 320, rugs or floor coverings 322, desks or tables 324, light fixtures 326, plants or planters 328, room dividers 330, interior walls 332, wall décor or hanging items 334, windows and window shades 336, flooring 338, and ceiling elements 340, among others. In some embodiments, any or all of these items can be customized.

In some embodiments, though not shown in the figures, the customer may view the virtual environment separate from the viewpoint selectors 310. For example, the customer is free to rotate the room around the viewpoint selector 310 at which the customer is generally positioned. For example, the customer may rotate the view shown in FIG. 3A horizontally to see what is "behind" the viewpoint as presented in FIG. 3A. Similarly, the customer may rotate the view shown in FIG. 3B to see a corner behind the viewpoint as presented in FIG. 3B. Similarly, the customer may rotate the view vertically to see the floor or ceiling more clearly.

FIG. 4 illustrates an example of a dataflow 400 for building a virtual environment including interactive objects (for example, the virtual environment of FIGS. 3A and 3B) using the virtual environment system 100 of FIG. 1. As shown and as described herein, the customer may interface with the system 100 via the client computing device 104 and may provide an input 402 via the client computing device 104. The input 402 may comprise a request for the customer to view a website comprising the virtual environment. For the purpose of the discussion of FIG. 4, the requested website may be a new virtual environment based on one of the template and custom images. Thus, at (1), the client computing device 104 transmits a request or message to the host 110 (for example, via the network 102) requesting that the host provide the client computing device 104 with a website, interface, view, or the like. In some embodiments, the request at (1) includes the customer's selection of a type of new virtual environment (for example, based on template or custom images) and an indication of what items to include in the generated virtual environment or customer's selection of an existing environment saved in the customer's profile or generally available (described with reference to FIG. 5). In some embodiments, the customer's indication of what items to include and where in the generated virtual environment is provided by the customer after the space of the virtual environment is generated by the virtual environment generator 108 (not shown in this figure). Once the host receives the request for the website from the client device 104 at (1), the host 110 sends a request for environment images to the image source 106, at (2). The host 110 also sends a request for the virtual environment to the virtual environment generator 108, at (3). In some embodiments, the separate requests are sent at (2) and (3) to inform the corresponding components that a new virtual environment is requested. In some embodiments, when the virtual environment is being generated based on one or more template images or based on custom images (for example, custom to the customer).

Once the image source 106 receives the request for the images for the virtual environment (which may include a selection of specific images), the image source 106 may provide the images to the virtual environment generator 108, at (4). In some embodiments, the images provided to the virtual environment generator 108 are in the Standard for Exchange of Product, STP3, format, or some similar format. In some embodiments, one or more of the images provided to the virtual environment generator 108 are wire frames of the items to be placed in the virtual environment or of the space of the virtual environment. The wire frames of the items and/or space may comprise polygon faces that can be configured to adjust a color and/or pattern of the items or space, for example based on selections by a corresponding configurator module. For example, the seat of a chair may be represented by a number of polygons of a wire frame image of the chair. To adjust the color and/or texture of the seat, the polygons that make up the seat in the wire frame image may be adjusted to the desired color and/or texture by the configurator module. Thus, the single wire frame image of the chair can be used to generate any color and/or texture of chair by just modifying the appropriate polygons of the wire frame image by making one or more selections via the configurator module. The configurator module may be configured to automatically adapt the wire frame image of items in the virtual environment based on user selections of color, texture, material, and the like to generate the virtual representations of the items with applied customizations and/or selections.

As such, the wire frames may be used generically for each item type or space type, such that each color or pattern of a particular chair type does not need to have a separate image. Instead, the virtual environment generator 108 may adjust a color and/or pattern applied to a polygon face of the wire frame to adjust the color and/or pattern of the selected item. Such methods of implementing the items and spaces of the virtual environments may reduce storage space required (where each color/pattern combination for an item does not need to have its own stored image) for the system 100 and improve virtual environment generation times.

In some embodiments, the host 110 may provide the item images for each item to be included in the virtual environment to the virtual environment generator 108, at (5). In some embodiments, though not shown, the image source 106 may provide the images to the virtual environment generator 108 for each of the items to be included in the virtual environment in the appropriate format. In some embodiments, the host 110 (or the image source 106) may provide specific product configurations for items to include in the virtual environment. For example, the configuration may include selections of particular options for the items (for example, fabrics and finishes, etc.). Additionally, the host 110 or the image source 106 may provide inspiration files, which may include images of other environments to use as inspiration in generating the virtual environment to include the selected items in the generated virtual environment space. In some instances, one of the host 110 or the image source 106 will be configured to identify objects, surfaces, spaces, etc., in the captured image for use in generating the wire frames and other virtual representation information needed to generate the virtual environment space.

The virtual environment generator 108 may receive the space images from the image source at (4) and the item images and specifications at (5). The virtual environment generator 108 may render the virtual environment to include the space and the items. In some embodiments, the virtual environment generator 108 may generate multiple viewpoints within the space of the virtual environment to allow the customer to view the space from different perspectives. The virtual environment generator 108 may generate the generated virtual environment to allow the customer to spin around a viewpoint. In some embodiments, the virtual environment generator 108 may place the viewpoint selectors 310 for different viewpoints within the generated virtual environment. In some instances, the item images are received in response to a request for item images, not shown in FIG. 4.

In some instances, the virtual environment generator 108 may generate the virtual environment and the corresponding package at (6). In some embodiments, the virtual environment and the corresponding package are generated based on the received images such that the different aspects of the environment (for example, walls, floors, ceilings, lights, countertops, windows, and the like) are represented in the virtual environment. The environment and each of these features may be represented as wire frames or the like. Similarly, the corresponding package may include details of the items from the item images, also represented as wire frames or the like and including details for the items. In some embodiments, the virtual environment generator 108 may place the items into the virtual environment automatically, using the inspiration files to determine generally where to place the items relative to each other and the space in the virtual environment. In some embodiments, the virtual environment generator 108 will request the host 110 to identify where to place one or more of the items and/or the viewpoint selectors 310 in the virtual environment space, for example, based on the images available. Additionally, the host 110 may request the customer to identify where to place the items and/or viewpoint selectors 310 via the client computing device 104. Thus, one or more of the virtual environment generator 108, the host 110, and the client computing device 104 may provide locations for purchasable and/or non-purchasable items, configurable and non-configurable items, viewpoint selectors 310, and customization selectors 312 in the space of the virtual environment. In some embodiments, once the items and selectors are placed in the virtual environment, the virtual environment generator 108 may package or stitch the virtual environment into a self-contained package so that all necessary files, etc., for the virtual environment are contained in a single package. This may allow distribution of the virtual environment without requiring a connection with external data sources, and so forth.

In some embodiments, the generated virtual environment and corresponding package is conveyed from the virtual environment generator 108 to the host 110 at (7), which further provides the generated virtual environment and corresponding package to the client device 104 at (8), for example via a website, app, or similar interface.

In some embodiments, the host 110 without having to reference image or item files stored elsewhere can host the generated virtual environment. In some embodiments, the virtual environment generator 108 may link the configurable and/or purchasable items to configuration modules (for example, at the host 110) to enable the customer to customize, configure, and purchase items that are purchasable and customize/configure non-purchasable items. For example, items such as the chairs 320 and desks 324 may be customizable, configurable, and purchasable. Thus, the customer may access a linked configuration module to customize, configure, and purchase the chairs 320 and/or desks 324. In some embodiments, the windows 336 may not be purchasable. Thus, the customer may access a linked configuration module to customize or configure the windows 336 (for example, to change the feel of the virtual environment) but may not be able to purchase the windows 336. The linked and packaged/stitched virtual environment may be embedded into a client website or otherwise presented to the customer via the client computing device 104 and/or the host 110.

In some embodiments, the virtual environment includes an expandable window 375 that identifies the purchasable items in the virtual environment. For example, FIG. 3C shows an example of the expandable window 375 that provides a summary of items (purchasable or non-purchasable) available for purchase or interaction in the example virtual environment as generated and implemented by the virtual environment system of FIG. 1. In some embodiments, the identified purchasable items are specific to the current viewpoint in the virtual environment. For example, the expandable window 375 for the viewpoint of FIG. 3A may include the different chairs 320 and the different desks or tables 324 (as compared to the viewpoint of FIG. 3B) because the chairs 320 and the desks or tables 324 are purchasable. The expandable window 375 for the viewpoint of FIG. 3A may not include the rug 322, the light fixtures 326, the plants 328, the windows 336, interior walls 332, the flooring 338, the ceiling elements 340, the room divider 330, the wall items 334, and so forth. The expandable window 375 does show options for desks or tables 324 (for example, dining tables), chairs 320, benches 376, buffets 378, bar carts 380 or similar storage, and small tables 382. Thus, the expandable window 375 may allow the customer to identify quickly which items are available for purchase and customization. In some embodiments, the items shown in the expandable window 375 may be "clickable" so that the customer can quickly access the configuration module for the selected item. In some embodiments, the expandable window 375 provides the customer with options that can be added to the virtual environment but that might not already be included. For example, if the customer selects a bench 376 or bar cart 380 from the expandable window 375, the customer may be given an option to add the selected item to the virtual environment in a desired location and/or configuration. In some instances, the expandable window 375 may be clickable to enable the customer to interact with the window and view items and/or item features shown in the expandable window 375.

In some embodiments, though not shown in the figures, the virtual environment includes a button that highlights or visually identifies which items in the virtual environment are purchasable and/or configurable and which items are not purchasable and/or configurable. For example, the button, which clicked or activated, may highlight or place the customization selectors 312 on items that are configurable and purchasable, thereby enabling the customer to more easily identify which items can be configured and/or purchased. In some embodiments, the purchasable and/or configurable items are automatically identified based on available configurator modules 217 and/or corresponding sources.

In some embodiments, the virtual environment includes options for selecting different color schemes. For example, the color schemes may be generated seasonally or at other interfaces based on a specified roadmap and/or specific to customer needs and/or current trends. Thus, the customer may be able to visualize how an existing space will look updated according to current trends by generating the virtual environment based on the existing space. In some embodiments, changes to the color schemes and/or the aesthetics, as described herein, may essentially be links to different virtual environments. For example, the cool/warm aesthetics described above may correspond to different cool/warm virtual environments. In some embodiments, the changes to the color schemes and/or aesthetics may merely reconfigure (for example, via the configuration module) the colors, etc., of the configurable items within a single virtual environment. Such a configuration may reduce storage requirements where storing multiple virtual environments utilizes additional memory space as compared to a single virtual environment with multiple configurations available.

FIG. 5 illustrates an example of a dataflow 500 for using the virtual environment built using the dataflow 400 of FIG. 4 and the system 100 of FIG. 1. As shown and as described herein, the customer may interface with the system 100 via the client computing device 104 and may provide an input 502 via the client computing device 104. The input 502 may comprise a request from client computing device 104 for the customer to access a website comprising the virtual environment. For the purpose of the discussion of FIG. 5, the requested website may comprise an existing virtual environment, for example, one stored for the customer or a generic virtual environment that already exists. Thus, at (1), the client computing device 104 transmits a request or message to the host 110 (for example, via the network 102) requesting that the host provide the client computing device 104 with the website that includes the previously generated virtual environment. In some embodiments, the request at (1) includes the customer's login information and/or selection of a saved virtual environment or the generic virtual environment. Since the virtual environment already exists, the customer does not need to provide any other inputs (for example, no selections of items to include, etc.). Once the host 110 receives the request for the website from the client computing device 104 at (1), the host 110 sends the client computing device 104 the requested virtual environment, at (2). While the customer is viewing the virtual environment via the website, the customer may select a configurable and purchasable item. Such selection may generate a request to the host 110 for the item configurator for the selected item, at (3).

The host 110 may receive the request at (3) and provide the client computing device 104 with the requested item configurator, at (4). In some embodiments, the request at (3) includes a link to the requested item configurator, which may case a burden on the host 110. At (5), the client computing device 104 uses the item configurator to make a call to the data sources 112-116 for configuration information for the selected item. For example, the data call may include requesting all available seat color options, or other options associated with the selected item. The data sources 112-116 may provide the requested options information, at (6). Once the client computing device 104 has the options information, the customer may use the configuration module to configure the selected item. The customer can then opt to purchase the configured item or view the configured item in the virtual environment. Thus, in some embodiments, changes that the customer makes to an item via the corresponding configuration module are saved and/or reflected in the virtual environment. In some embodiments, such updates may be saved for future viewing, such that the virtual environment is updated with the latest configurations presented by the user (not shown in the figures).

In some embodiments, the methods and systems described herein overcome multiple issues and provide various benefits. For example, generating virtual environments based on photographs of the real world space is generally expensive and may be cost prohibitive for many entities. Furthermore, generating a seamless and navigable virtual environment with the desired items based on photographs may be difficult. Providing such photographs would require finding and photographing a corresponding space that includes the furniture in the multiple color palettes, which would be expensive, if not impossible, to do. By generating the virtual environment as described herein based on files of existing products and spaces, photographs of the desired virtual environment are not required. Instead, the desired virtual environment can be built based on the existing product files and images of corresponding spaces for the virtual environment. The virtual environment builder and corresponding item configuration modules provide a cost effective, scalable method and system for generating customizable virtual environments. As described herein, the virtual environment is created completely from digital files, allowing for customization and edits that do not require additional photoshoots and allow for quick changes.

An additional benefit provides for visualization of items according to different color palettes alongside other products in the virtual environment. In some embodiments, a customer may be unable to visualize a product in their space. For example, colors can be polarizing and customers may have trouble visualizing differences in color or how colors work together without actually seeing the colors together. The methods and systems described herein allow for the integration of multiple color palettes into a single virtual environment. For example, the virtual environment described herein may allow the customer to quickly change colors for items and immediately visualize the item in a different color.

Additionally, virtual reality experiences generally require specific software/hardware that can be expensive and deliver a cartoon-like experience. However, the described methods and systems enable the customer to view virtual environments within a browser or application setting. There is no need to download software or purchase expensive hardware goggles. The systems and methods may provide a seamless, one-click launch experience and provide the customer with high-resolution renderings of the virtual environment that creates a more realistic experience for the customer.

In some embodiments, the systems and methods described herein allow the customer to create their own space from scratch. For example, the customer can generate the virtual environment based on an empty space, where the customer can select and place configurable/purchasable items in the empty space. Alternatively, as described above, the customer may upload images of a specific space that they wish to include in the virtual environment. Such an option may allow the customer to upload their specific space images and place configurable/purchasable items to build a digital representation of their desired space.

In some embodiments, the systems and methods described herein may allow the customer to change and/or configure non-purchasable items. For example, the rug 322, windows 336, and so forth may be customizable (for example, patterns, window coverings, etc.) even though the customer may be unable to purchase the specific items.

In some embodiments, the systems and methods described herein may integrate the virtual environment into a digital brochure, which may create a more immersive experience for the customer. For example, the customer may be able to use the expandable windows described above to view items that they can purchase as opposed to items that are just shown to create a complete environment. In some embodiments, the digital brochure may be customizable. For example, as the customer navigates through a single or multiple virtual environments, the methods or system may build a customized brochure featuring the individual spaces and products selected. The customer may be allowed to save and share its digital brochure. In some embodiments, the virtual environment may provide pricing information and/or ordering features. In some embodiments, as described herein, the expandable window may allow the customer to easily identify purchasable or configurable items in the viewpoint of the virtual environment and easily access the configuration modules for the identified items. This may simplify item customization and ordering.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or blocks are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following.

What is claimed is:

1. A system comprising:
    one or more hardware processors configured to execute computer-executable instructions to:
        based at least in part on a determination of a first space and a first object of a plurality of objects to be placed in the first space, access, from one or more data sources, an environment image corresponding to the first space and a first object image corresponding to the first object;
        generate a first virtual environment that comprises virtual representations of the first space and the first object, wherein the generation of the first virtual environment includes applying a first texture to the first object so that the first object appears to represent a color, pattern, material, physical texture, or physical size based on what appears in the first object image;
        transmit, to a client device, display instructions to cause display of the first virtual environment and options for adjusting the virtual representation of the first object; and
        in response to receiving a first selection of at least one of the options, transmit, to the client device, updated display instructions to cause display of the first virtual environment that includes application of a second texture to the first object, wherein the second texture is different than the first texture.

2. The system of claim 1, wherein the one or more hardware processors are further configured to execute the computer-executable instructions to store the first virtual environment in the one or more data sources.

3. The system of claim 1, wherein the generation of the first virtual environment is further based on one or more sample environments.

4. The system of claim 1, wherein the one or more hardware processors are further configured to execute the computer-executable instructions to:
    generate an interactive user interface that provides one or more interactive features of the first virtual environment to enable toggling between different aesthetics; and
    transmit, to the client device, second updated display instructions that include the first virtual environment that is configured to be displayed in the interactive user interface.

5. The system of claim 4, wherein toggling between the different aesthetics comprises changing at least a portion of the one or more interactive features of the first virtual environment, wherein the one or more interactive features of the first virtual environment comprise at least one of: a color, a material, and a texture of a surface within the first virtual environment.

6. The system of claim 4, wherein the interactive user interface further provides at least one viewpoint selector in the first virtual environment, wherein the at least one viewpoint selector enables a changing of a perspective view of the first virtual environment based on a selected viewpoint.

7. The system of claim 4, wherein the interactive user interface further provides at least one customization selector in the first virtual environment, wherein the at least one customization selector enables a manual changing of at least a portion of the one or more interactive features of the first virtual environment.

8. The system of claim 1, wherein the updated display instructions are further configured to cause display of an interactive user interface that allows for a manual manipulation of a location of the first object in the first space.

9. The system of claim 1, wherein the virtual representations of the first space and the first object are received in a self-contained package inclusive of all corresponding files.

10. The system of claim 1, wherein the applying of the first texture to the first object is automatic and based at least in part on a preconfigured aesthetic option.

11. The system of claim 1, wherein the virtual representation of the first object comprises one or more of: a seating implement or a table.

12. The system of claim 1, wherein the one or more hardware processors are further configured to execute the computer-executable instructions to:
receive, from the client device, an indication of a desire to purchase a furniture product corresponding to the first object, wherein the furniture product is manufactured based at least in part on any specific color, pattern, material, or physical texture corresponding to the virtual representation of the first object that is viewable on the client device.

13. The system of claim 1, wherein each of the plurality of objects appears differently than what appears in the first object image.

14. The system of claim 1, wherein the virtual representation of the first object corresponds to a furniture product available for purchase.

15. The system of claim 1, wherein determination of the first object is based at least in part on a first list of furniture products available for purchase.

16. A method comprising:
based at least in part on a determination of a first space and a first object of a plurality of objects to be placed in the first space, accessing, from one or more data sources, an environment image corresponding to the first space and a first object image corresponding to the first object;
generating a first virtual environment that comprises virtual representations of the first space and the first object, wherein the generation of the first virtual environment includes applying a first texture to the first object so that the first object appears to represent a color, pattern, material, physical texture, or physical size based on what appears in the first object image;
transmitting, to a client device, display instructions to cause display of the first virtual environment and options for adjusting the virtual representation of the first object; and
in response to receiving a first selection of at least one of the options, transmitting, to the client device, updated display instructions to cause display of the first virtual environment that includes application of a second texture to the first object, wherein the second texture is different than the first texture.

17. The method of claim 16, further comprising:
receiving, from the client device, an indication of a desire to purchase a furniture product corresponding to the first object, wherein the furniture product is manufactured based at least in part on any specific color, pattern, material, or physical texture corresponding to the virtual representation of the first object that is viewable on the client device.

18. The method of claim 16, wherein each of the plurality of objects appears differently than what appears in the first object image.

19. The method of claim 16, wherein determination of the first object is based at least in part on a first list of furniture products available for purchase.

20. The method of claim 16, wherein the generation of the first virtual environment is further based on one or more sample environments.

* * * * *